(12) United States Patent
Geraniotis et al.

(10) Patent No.: US 7,310,391 B2
(45) Date of Patent: Dec. 18, 2007

(54) DE-MODULATION OF MOK(M-ARY ORTHOGONAL MODULATION)

(75) Inventors: Evaggelos Geraniotis, Potomac, MD (US); Mohamed M. Khairy, Germantown, MD (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 11/713,851

(22) Filed: Mar. 5, 2007

(65) Prior Publication Data

US 2007/0183542 A1 Aug. 9, 2007

(51) Int. Cl.
*H03D 1/00* (2006.01)
(52) U.S. Cl. ...................................... 375/340; 375/325
(58) Field of Classification Search ................. 375/316, 375/329, 340, 325
See application file for complete search history.

(56) References Cited

U.S. PATENT DOCUMENTS

| | | | |
|---|---|---|---|
| 5,329,547 A | | 7/1994 | Ling |
| 5,767,738 A | * | 6/1998 | Brown et al. ................ 329/304 |
| 6,366,624 B1 | * | 4/2002 | Balachandran et al. ...... 375/341 |
| 6,385,185 B1 | * | 5/2002 | Huang ......................... 370/342 |
| 6,567,475 B1 | * | 5/2003 | Dent et al. ................... 375/286 |
| 6,567,481 B1 | * | 5/2003 | Molnar ......................... 375/341 |
| 6,597,923 B1 | * | 7/2003 | Vanghi et al. ............... 455/522 |
| 6,798,852 B2 | * | 9/2004 | Khayrallah et al. .......... 375/341 |

OTHER PUBLICATIONS

M. Khalry et al., "BER of DS/CDMA Using Symbol-Aided Coherent Demodulation over Rican and Rayleigh Fading Channels," 1998 IEEE, pp. 435-440.

J. Cavers, "An Analysis of Pilot Symbol Assisted Modulation for Rayleigh Fading Channels," IEEE Transactions on Vehicular Technology, vol. 40, No. 4, Nov. 1991, pp. 686-693.

C. Berrou et al., "Near Shannon Limit Error-Correcting Coding and Decoding: Turbo-Codes," 1993 IEEE, pp. 1064-1070.

S. Benedetto, et al., "A Soft-Input Soft-Output APP Module for Iterative Decoding of Concatenated Codes," IEEE Communications Letters, vol. 1, No. 1, Jan. 1997, pp. 22-24.

C. Frank, et al., "Coherent and Noncoherent Decoding Metrics for the IS-95 Reverse Link".

R. Frank, "Polyphase Complementary Codes," IEEE Transactions on Information Theory, vol. IT-26, No. 6, Nov. 1980, pp. 641-647.

R. Frank, "Polyphase Codes with Good Nonperiodic Correlation Properties," IEEE Transactions on Information Theory, Jan. 1963, pp. 43-45.

M. Golay, "Complementary Series," IEEE Transactions on Information Theory, Apr. 1961, pp. 83-87.

R. Sivaswamy, "Multiphase Complementary Codes," IEEE Transactions on Information Theory, vol. IT-24, No. 5, Sep. 1978, pp. 546-552.

K. Halford, et al., "Complementary Code Keying for Rake-Based Indoor Wireless Communication," 1999 IEEE, pp. IV-427-IV-430.

* cited by examiner

*Primary Examiner*—Emmanuel Bayard

(57) ABSTRACT

Apparatus for iterative detection and demodulation of M-ary orthogonal signals (MOK) and signals using Complementary Code Keying (CCK). The apparatus comprises a non-coherent detector that is used during the first iteration and in subsequent iterations uses a coherent detector that is responsive to a soft decoder that is responsive to the detectors. For MOK signals use is made of the first chip, which is known, obviating the need for a pilot signal.

6 Claims, 11 Drawing Sheets

```
DATA        HADMARD SYMBOL (M=4)
 00              ++++
 01              +-+-
 10              ++--
 11              +--+

TO GENERALIZE FOR M=2^b
```

$$H_M = \begin{bmatrix} H_{M/2} & H_{M/2} \\ H_{M/2} & -H_{M/2} \end{bmatrix}$$

8 BPSK CHIPS 256 CODEWORDS (MOK)

8 QPSK CHIPS 65536 CODEWORDS (CCK)

DE-MODULATION OF MOK(M-ARY ORTHOGONAL MODULATION)

RELATED APPLICATIONS

This application is related to and claims priority from U.S. application Ser. No. 11/203,343, dated Aug. 12, 2005, now U.S. Pat. No. 7,200,191, which in turn is a continuation application of U.S. application Ser. No. 09/716,565, dated Nov. 20, 2000 now U.S. Pat. No. 6,977,974.

FIELD OF THE INVENTION

The present invention relates to the detection and demodulation of M-ary orthogonal signals (MOK) and Complementary Code Keying (CCK) signals, in particular by using an iterative combination of noncoherent and coherent systems and methods.

BACKGROUND OF THE INVENTION

There is a move towards high data rate transmission in wireless communication systems. Efforts are now directed towards developing wireless systems that provide data rates on the order of 10 Mb/s. To achieve these high rates there has been a search for modulation schemes more efficient than M-ary PSK.

Different forms of orthogonal modulation have been considered and adopted by various standards committees. A form of orthogonal modulation was adopted in the IS-95 standard as the modulation technique used for the return link. $J=\log_2 M$ bits are transmitted per symbol and one of M orthogonal binary sequences known as the Hadamard-Walsh functions is selected for transmission. This technique is called M-ary orthogonal keying (MOK).

One of the main advantages of MOK is the ability to demodulate the signals noncoherently with minimal performance degradation. Compared to differential PSK, noncoherent detection of MOK has a much better performance and so it has been considered by a number of different standards. MOK may have better BER performance than BPSK, which is due to the embedded coding properties of MOK. For the above mentioned advantages, MOK is considered a great choice for reverse link communications, where there is usually no pilot or reference signal to assist coherent detection.

For Additive White Gaussian Noise (AWGN) channel, the performance difference between noncoherent and coherent detection of MOK is less than 1 dB for M>2. For fast fading channels, the performance of noncoherent detection may be several dBs worse than that of coherent detection. Practical systems, especially terrestrial mobile communication systems with low SNR and severe fading, concatenate MOK with a form of forward error correction, usually convolutional codes. The present invention could work for MOK with any kind of outer coding. That is, the outer code need not be a convolutional code, but any code that can be decoded while generating soft decoder outputs. Optimum reception of this scheme is to implement one maximum likelihood receiver, which is very complex to implement. For near optimum reception of this coded system, soft detection information should be exchanged between the different blocks of the receiver.

SUMMARY OF THE INVENTION

A method where convolutionally coded data is orthogonally modulated using MOK is presented. At the receiver, following the noncoherent detection of the MOK symbols, a simple metric is calculated and passed to the MAP decoder to decode the symbols. Following decoding, the soft decoder outputs are then used to calculate the probabilities of different symbols, a channel estimator is used to estimate the fading channel and help re-demodulate the MOK signal coherently. The steps of decoding and channel estimation are then iteratively repeated until there is no gain or recognition improvement or until the recognition improvement is outweighed by the effort to achieve the recognition improvement.

That is, a method is presented for use in a receiver for detecting and demodulating M-ary orthogonal signals (MOK) comprising the steps of receiving convolutionally coded M-ary orthogonally modulated symbols over a channel, demodulating said M-ary orthogonally modulated symbols, calculating a metric, decoding said symbols, calculating probabilities of different symbols for each symbol instance, estimating a fading channel responsive to calculating the probabilities and iteratively feeding said metric, said decoded symbols, said probabilities and said estimate back into said demodulating step to re-demodulate said symbols coherently. The method may also include interleaving on the transmitter side and corresponding de-interleaving on the receiving side.

The method has been tested for Rayleigh and Rician fading channels with different fading rates where it shows considerable improvement over conventional noncoherent detection especially for fast fading channels.

An improvement to the first embodiment using a quasi-coherent detector is presented. It was noticed that all the MOK symbols start with a "1" so a form of symbol aided demodulation (SAD) is applied to the MOK signals. A method that uses the known first chip of every symbol is presented and tested for fading channels. A comparison between the two methods is presented graphically.

A similar technique called complementary code keying (CCK) has been adopted by the IEEE 802.11 subcommittee for wireless local are networks (WLAN) for transmission of data rates of 5.5 and 11 Mb/s. CCK is a generalized form of (M-ary biorthogonal keying) MBOK.

After studying the application of CCK for terrestrial fast fading communication channels, it was found that for fast fading channels, the performance of noncoherent detection of CCK is significantly worse than that of the coherent detectors, even more than that encountered in the MOK case. A second alternative embodiment of the present invention is a modification for the existing CCK systems that greatly enhances the performance of CCK for fast fading channels. The second embodiment presents a method for use in a receiver for detecting and demodulating a signal of complementary code keying (CCK) symbols comprising the steps of receiving complementary coded keying (CCK) modulated symbols over a channel, demodulating said complementary code keying modulated symbols, decoding said symbols, adding an extra known chip at a beginning of every symbol, calculating probabilities of different symbols for each symbol instance, calculating expected values of complex conjugates of every chip, estimating the fading channel at different chip positions within said symbol and iteratively feeding said decoded symbols, said probabilities and said estimate back into said demodulating step to re-demodulate said symbols.

BRIEF DESCRIPTION OF THE DRAWINGS

The present invention will now be described in greater detail with reference to the preferred embodiments of the invention, given only by way of example, and illustrated in the accompanying drawings in which.

DETAILED DESCRIPTION OF THE PREFERRED EMBODIMENTS

Figures 1, 2:
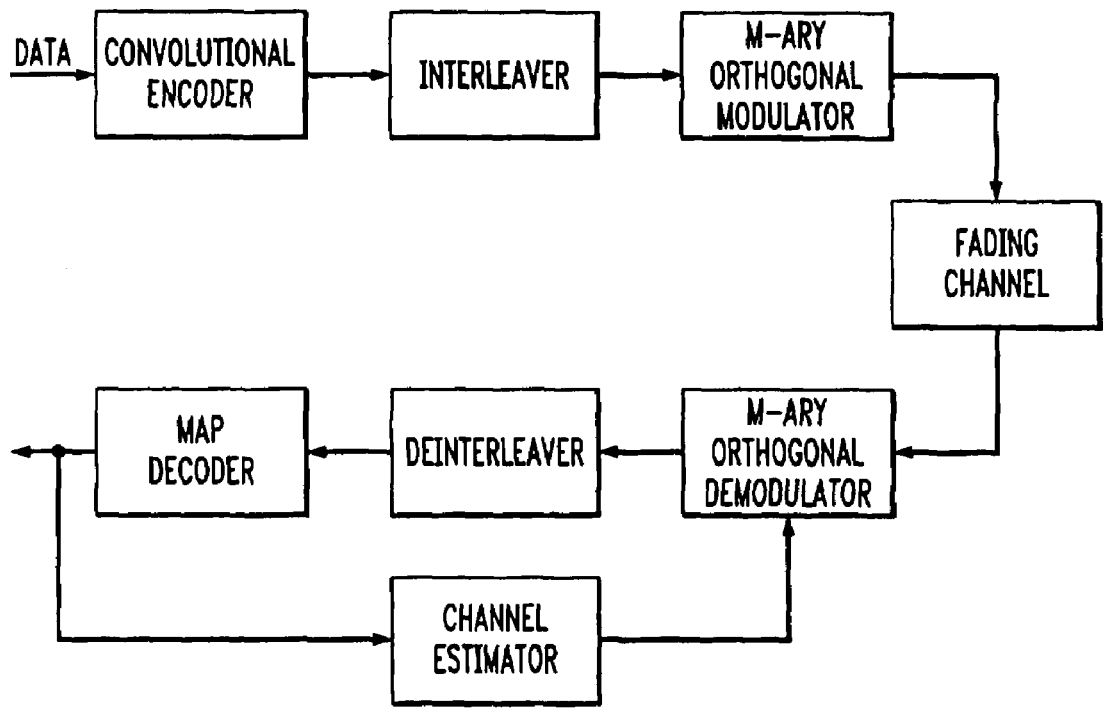
FIG. 1 shows the block diagram of the noncoherent-coherent system.
FIG. 2 shows the method to construct the signal set for MOK.

FIG. 1 shows the block diagram of the system including both modulation and demodulation as well as the fading channel over which the MOK signal is transmitted. On the transmission (modulation) side the data is input to a convolution encoder, which encodes the data. The encoded data is output from the convolutional encoder into an interleaver. The output of the interleaver is input into an M-ary orthogonal modulator, which outputs the signal to a channel. On the receiver (demodulation) side the signal is detected and demodulated by an M-ary orthogonal demodulator. The output of the demodulator is input to a deinterleaver. The output if the deinterleaver is input to the MAP decoder, which decodes the data. Channel estimation is then performed by a channel estimator. The channel estimation metrics are then introduced into the M-ary orthogonal noncoherent demodulator in a feedback model to re-demodulate the signal coherently. The steps of interleaving and de-interleaving are optional but advantageous. The transmitted signal s(t) is given by $$s(t) = A \sum_{k=-\infty}^{\infty} \alpha_k(t-kT) \quad (1)$$

where $\alpha_k(t)$ is a symbol from an orthogonal set of symbols to be transmitted during the $k^{th}$ symbol time interval.

$$\alpha_k(t) = \sum_{l=1}^{M} \alpha_k^l p(t-lT_c)$$

where $\alpha_k^l$ is the $l^{th}$ chip of the $k^{th}$ symbol. $p(t-lT_c)$ is the chip waveform of arbitrary shape and unit energy.

The type of modulation considered here is called M-ary Orthogonal Keying (MOK). FIG. 2 shows the method to construct the signal set for MOK. Each symbol is composed of M chips, which will represent $\log_2 M$ coded data bits. This set of symbols is called Hadamard-Walsh orthogonal sequences. It can be verified that any two vectors resulting from this mapping have inner products that are exactly zero, and hence all M waveforms are orthogonal to one another.

Defining $E_b$ as the energy per data bit. Now define $E_c = E_b r_c$ as the energy per coded bit, where $r_c$ is the convolutional code rate. Every $b = \log_2 M$ coded bits will be transmitted as one of the MOK symbols. Each MOK symbol consists of M chips, the energy per symbol is $E_s = bE_c$, and the energy per chip is given by $E_{ss} = E_s/M$. That is, the energy per symbol is the bit energy times the convolutional code rate.

Figure 3:
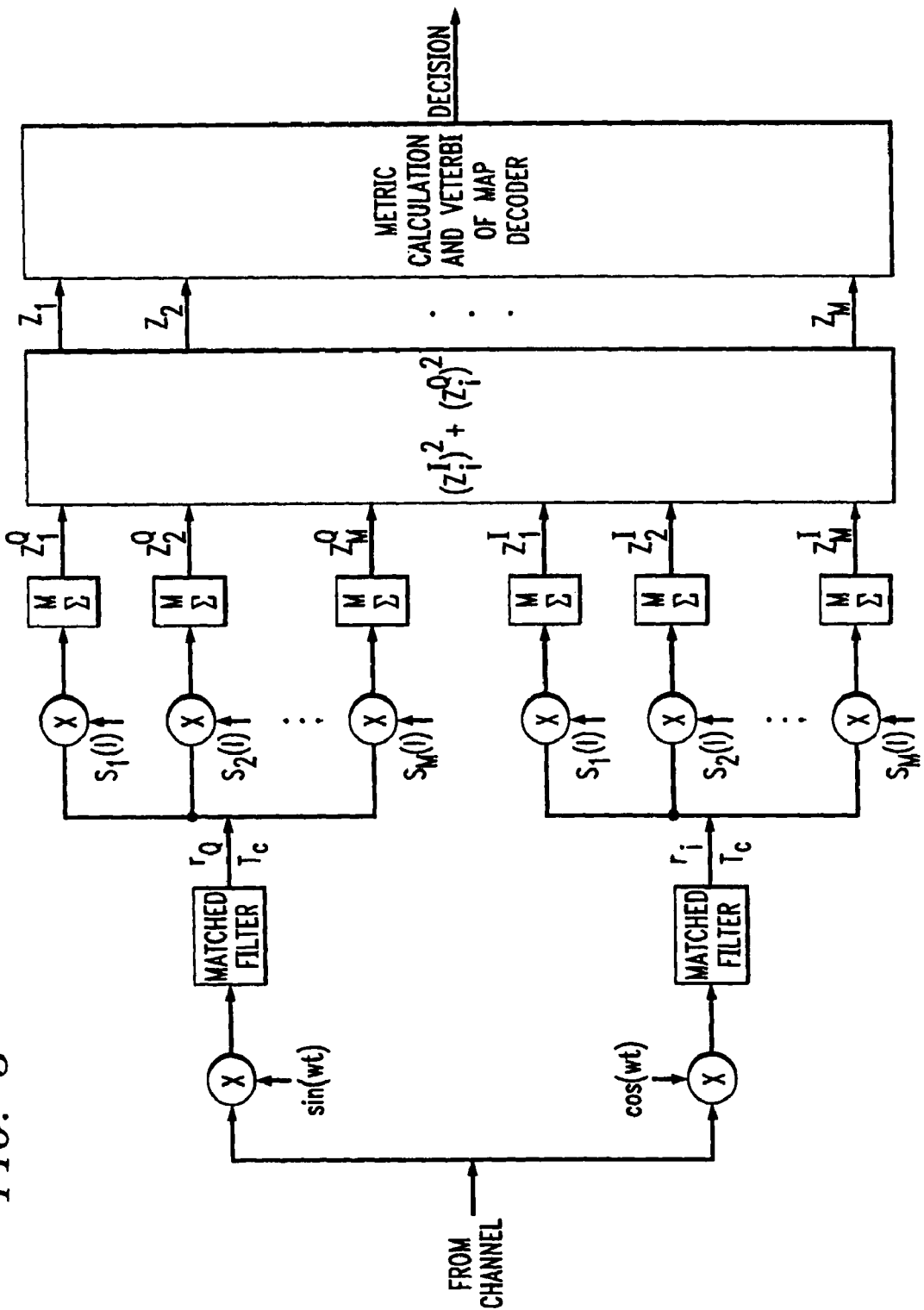
FIG. 3 depicts a bank of M orthogonal noncoherent correlators, which is the optimum detector for Hadamard-Walsh orthogonal modulation.
Figure 4:
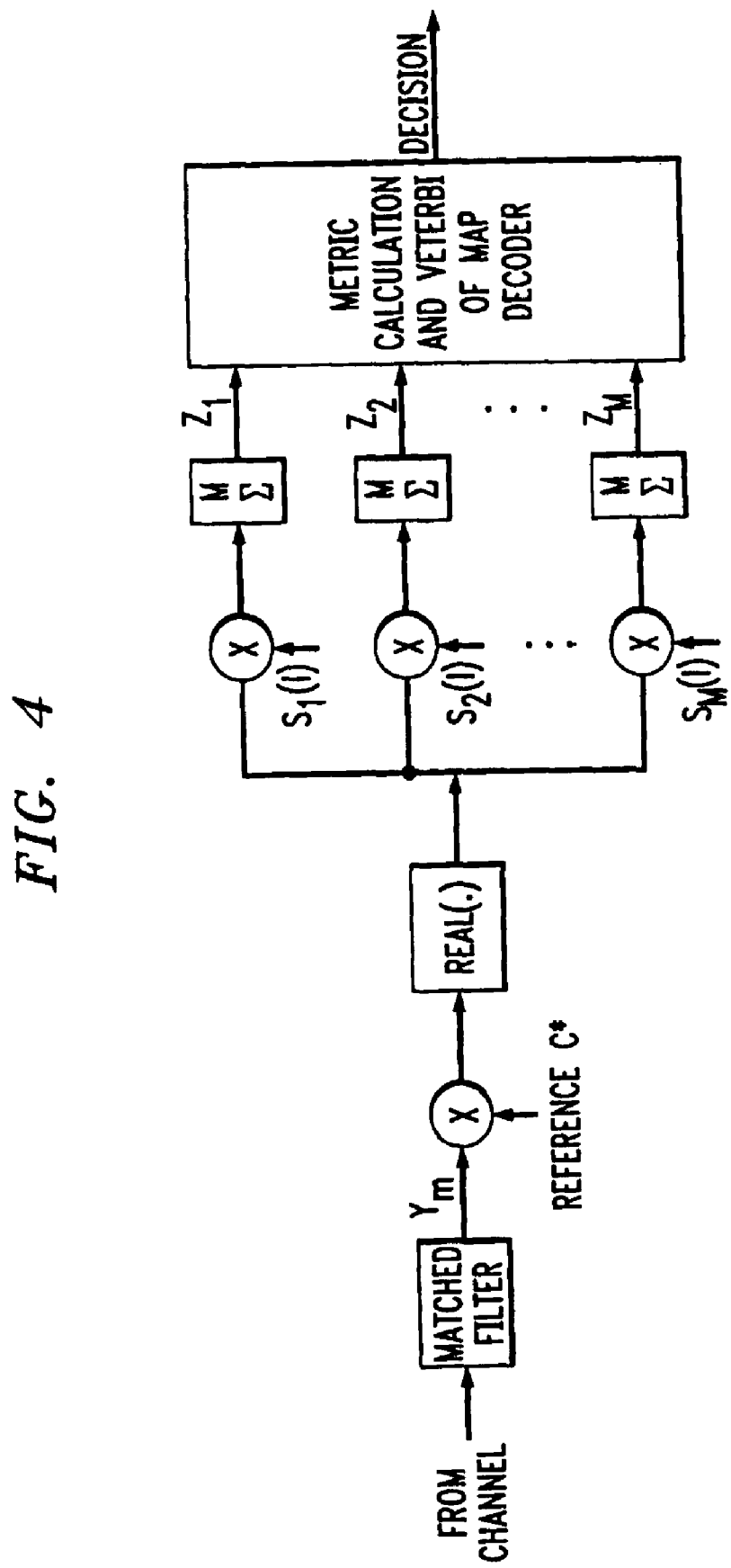
FIG. 4 shows the optimum coherent receiver.

The optimum noncoherent detector for Hadamard-Walsh orthogonal modulation is a bank of M orthogonal noncoherent correlators, as shown in FIG. 3, while the optimum coherent receiver is shown in FIG. 4.

FIG. 3 depicts the noncoherent detector/demodulator of the MOK receiver, which is used for a first pass through the feedback loop. Thereafter, the output of the noncoherent detector/demodulator is used as a reference to the coherent detector/demodulator of the MOK receiver, which is depicted in FIG. 4. The apparatus used to detect/demodulate MOK symbols, therefore, comprises both the noncoherent detector/demodulator depicted in FIG. 3 and the coherent detector/demodulator depicted in FIG. 4.

Referring first to FIG. 3, the signal received from the fading channel is multiplied by sin ($\omega$t) and cos ($\omega$t). Each of the products are then each passed through normalized matched filters resulting in real and imaginary components of the received signal. Each of these components is sampled at a clock rate of $1/T_C$, where $T_C$ represents the chip duration, which is the symbol duration divided by M. Since it is known at this point that a symbol has been received but not which symbol, each of the possible symbols is multiplied by the real and imaginary components of the received signal, respectively, and summed. That is, $$z_i^I(k) = \sum_{l=1}^{M} r_I(l)s(l)$$

$$z_i^Q(k) = \sum_{l=1}^{M} r_Q(l)s(l)$$

where $r_I(l)$ and $r_Q(l)$ are the $l^{th}$ samples of the received signal, $s_i(l)$ is the $l^{th}$ sample of M possible symbols and the results $z_i^I$ and $z_i^Q$ are the in-phase and quadrature components of the combination of the received signal, the multipath distortion, any other interference and noise. That is, $z_i^I$ and $z_i^Q$ are in-phase and quadrature components of a modified version of the desired signal. These in-phase and quadrature components are then squared and added together on a component-by component basis resulting in $[z_i^{I*}(k)]^2+[z_i^Q(k)]^2$. This further results in $z_i$, which is fed into a MAP or Viterbi decoder and a metric calculator, the output of which is a tentative decision with respect to the symbol string. This then becomes the reference signal c* used in FIG. 4 for further coherent demodulation or re-demodulation of the received signal.

The coherent detection/demodulation depicted in FIG. 4 follows roughly the same logic as FIG. 3 but it is no longer necessary to generate an imaginary component because a reference signal is now available. The decision resulting from the coherent detection/demodulation is improved over the noncoherent detection/demodulation. Further iterations provide even further improvements. The number of iterations will vary dependent on the environment and can be stopped when the recognition improvement or gain diminishes with the effort. That is, the gain ceases to increase proportionately to the effort.

The received signal is given by $$r(t)=c(t)s(t)+n(t) \quad (2)$$

where n(t) is AWGN with power spectral density $N_0$ in the real and imaginary parts; and c(t) represents the flat frequency nonselective Rician fading channel complex gain, with autocorrelation function:

$$R_c(\tau) = \sigma_g^2\left(\frac{K}{1+K} + \frac{1}{1+K}J_o(2\pi f_D\tau)\right) \quad (3)$$

where K is the ratio between the line of sight power and the scattered power, $J_0$ is the zero order modified Bessel function of the first type; $f_D$ is the fading bandwidth; $\tau$ is the timing difference.

Define $$J_{\max} = \frac{R_s}{2R_f}$$

where $R_s$ is the chip rate and $R_f$ is the fading rate.

The normalizing matched filter, with impulse response $p*(-t)/(\sqrt{N_0})$, has an output given by $$r(k_i)=u(k_i)\alpha_k^i+n(k_i)$$

where $k_i$ represent the time instant of the $i^{th}$ chip of the $k^{th}$ symbol. The Gaussian noise samples n(k) are white with unit variance, and the complex symbol gain u(k) has mean $$E[u(k)] = \sqrt{\gamma_{ss}}\sqrt{\frac{K}{K+1}}$$

and variance $$\sigma_u^2 = \gamma_{ss}\frac{1}{K+1}$$

where the average SNR is given by $$\gamma_{ss} = \frac{E_s}{N_0}$$

A simplified decision metric was derived for Rayleigh fading channels with noncoherent detection. The metric for the more generalized Rician fading channel is now derived. For M-ary orthogonal signals, the output of the filters is denoted by $z_i$, i=1, ..., M. As shown in FIG. 1, the proposed system has a convolutional encoder/decoder pair that needs soft information from the MOK detector/demodulator. Therefore, it is necessary to derive the log likelihood ratio (LLR) for the data and code bits. The LLR is defined by $$L = \ln\left(\frac{p_1(Z')}{p_o(Z')}\right)$$

where $Z'=(z_1, z_2, \ldots, z_M)$ is the vector whose components are the M correlator (coherent or noncoherent) outputs. Consider the first bit (not chip) of the symbol and calculate its LLR. For Hadamard-Walsh codes, the first M/2 sequences will have a "0" in the first position, while the last M/2 sequences will have a "1" in the first position. Hence, given equiprobable input sequences, the LLR for the first bit is given by $$p_1(z) = 2/M \sum_{m=1}^{M/2} p(Z'/s_m)$$

$$p_o(z) = 2/M \sum_{m=M/2+1}^{M} p(Z'/s_m)$$

where $s_m$ is the $m^{th}$ sequence, and $p(Z/s_m)$ is the probability density function (pdf) of the M correlator outputs given that sequence m was sent. Because of the orthogonality of the sequences we can write these joint pdfs of the correlator outputs as $$p(Z'/s_m)=p_c(z_m)\Pi_{m'\neq M}p_N(z_{m'})$$

where $p_c(z)$ is the pdf of the correlator output corresponding to the correct signal sent, while $p_N(z)$ pertains to all the M−1 others. In the following subsections we will deal with the coherent and noncoherent receivers for the more general Rician fading channels.

The input to the detector is Rician distributed with $$f(r) = 2(K+1)re^{-(K+1)r^2-K}I_0\left[2r\sqrt{K(K+1)}\right] \quad (4)$$

where $I_0$ is the zeroth order modified Bessel function of the first kind.

For the noncoherent detector shown in FIG. 3, the received signal is given by $$r(k_i)=u(k_i)\alpha_k^i+n(k_i)$$

Now the receiver forms the signals representing the real and imaginary parts of r $$r_I=\text{Re}(r)$$

$$r_Q=\text{Im}(r)$$

where Re(.) represents the real part and Im(.) represents the imaginary part.

$$z_i^I(k) = \sum_{l=1}^{M} r_I(l)s(l)$$

$$z_i^Q(k) = \sum_{i=1}^{M} r_Q(l)s(l)$$

$$z_i(k) = [z_i^I(k)]^2 + [z_i^Q(k)]^2$$

For the output of the M−1 noncoherent detectors corresponding to the noise only, $z_i^Q(k)$ and $z_i^I(k)$ are Guassian with zero mean, and $z_i(k)$ is of exponential distribution. The pdf of $z_i(k)$ is given by $$p_N(z) = e^{-z}$$

The output of the detector corresponding to the transmitted signal is given by $$p_c(z) = \frac{z}{1 + \frac{1}{k+1}\frac{E_s}{N_o}} e^{-\frac{1}{(1+\frac{1}{K+1}\frac{E_s}{N_o})} - \frac{K}{K+1}\frac{E_s}{N_o}} I_0\left[2\sqrt{\frac{z}{1 + \frac{1}{K+1}\frac{E_s}{N_o}}\frac{K}{K+1}\frac{E_s}{N_o}}\right]$$

Now the LLR for the first bit is given by $$L = \ln\left[\frac{\sum_{m=1}^{M/2} p_c(z_m)\prod_{m'\neq m} p_N(z_{m'})}{\sum_{m=M/2+1}^{M} p_c(z_m)\prod_{m'\neq m} p_N(z_{m'})}\right]$$

$$L = \ln\left[\frac{\sum_{m=1}^{M/2} p_c(z_m)/p_N(z_m)}{\sum_{m=M/2+1}^{M} p_c(z_m)/p_N(z_m)}\right]$$

$$L = \ln\left[\frac{\sum_{m=1}^{M/2} e^{\frac{z_m E_s/N_o}{K+1+E_s/N_o} - \frac{K}{K+1}E_s/N_o} I_0\left(2\sqrt{\frac{z_m}{1+\frac{1}{K+1}\frac{E_s}{N_o}}\frac{K}{K+1}\frac{E_s}{N_o}}\right)}{\sum_{m=M/2+1}^{M} e^{\frac{z_m E_s/N_o}{K+1+E_s/N_o} - \frac{K}{K+1}E_s/N_o} I_0\left(2\sqrt{\frac{z_m}{1+\frac{1}{K+1}\frac{E_s}{K_o}}\frac{K}{K+1}\frac{E_s}{N_o}}\right)}\right]$$

In the case of Rayleigh fading, K=0 and the LLR reduces to $$L = \ln\left[\frac{\sum_{m=1}^{M/2} e^{\frac{z_m E_s/N_o}{1+E_s/N_o}}}{\sum_{m=M/2+1}^{M} e^{\frac{z_m E_s/N_o}{1+E_s/N_o}}}\right]$$

While in the case of Gaussian noise channel (no fading), K=∞

$$L = \ln\left[\frac{\sum_{m=1}^{M/2} I_0\left(2\sqrt{z_m \frac{E_s}{N_o}}\right)}{\sum_{m=M/2+1}^{M} I_0\left(2\sqrt{z_m \frac{E_s}{N_o}}\right)}\right]$$

The resulting LLR is the summation of either exponentials, modified Bessel functions or the product of both. A very good approximation for these types of functions is to choose the maximum term in the summation. The approximate LLR is given by $$L = \max_{m=1}^{M/2} z_m - \max_{m=M/2+1}^{M} z_m.$$

The performance of the optimum metric is very close to that of the simplified metric, the approximate LLR is used for decoding of the convolutional code. There is almost no gain or advantage in using the exact metric while the computational advantage gained by using the simplified metric is huge.

The coherent detector is shown in FIG. 4. In this case the LLr is given by $$L = \ln\left[\frac{\sum_{m=1}^{M/2} e^{z_m E_s/N_o}}{\sum_{m=M/2+1}^{M} e^{z_m E_s/N_o}}\right] \text{ where } z_m = \sum_{l=1}^{M} \text{Re}(y_l c_l^*) s_m(l)$$

where $c_l^*$ is the channel estimate. A very good approximation for this expression is $$L = \max_{m=1}^{M/2} z_m - \max_{m=M/2+1}^{M} z_m$$

Figure 5:
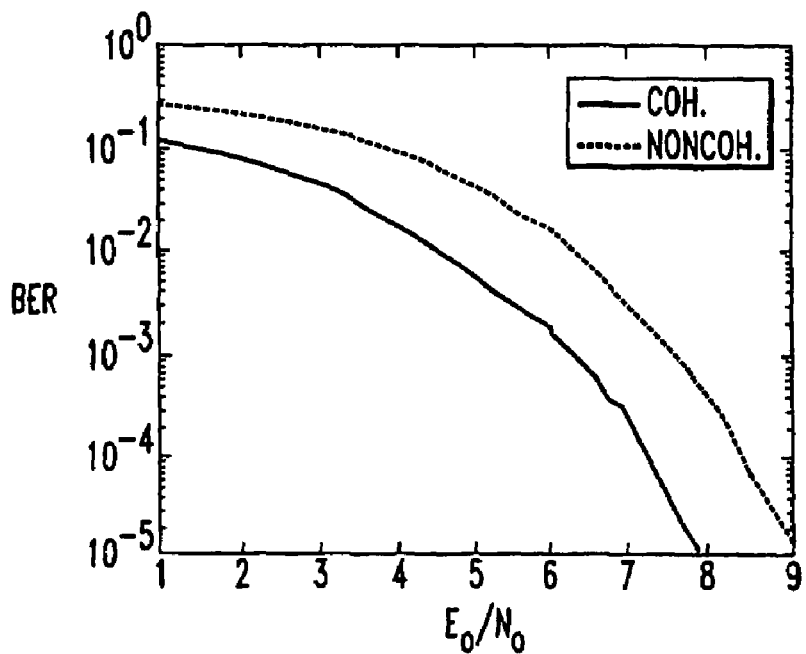
FIG. 5 shows the performance of coherent and noncoherent detection of orthogonally modulated convolutionally coded signals in AWGN environment.

In almost all the practical systems that implement some form of MOK, noncoherent detection is used. For AWGN, the difference between the coherent and noncoherent detection of MOK is very small. FIG. 5 shows the performance of coherent and noncoherent detection of orthogonally modulated convolutionally coded signals in AWGN environment. It can be noticed that the difference between the two schemes is less than 1 dB for BER≦10⁻³.

However, the difference in performance between coherent and noncoherent detection of MOK increases significantly with the increased rate of fading ($J_{max}$). This is due to the fact that the chips forming the symbol may be subject to different amplitude and phase distortion in the fading channel. In coherent detection, the fading channel is assumed fully known such that the effect of the changing amplitude and phase will not deteriorate the performance. Two alternate methods that use the concept of iterative decoding are presented to enhance the performance of MOK based systems without additional signal components (i.e., additional pilot signal).

The concept of iterative decoding was spurred on by the introduction of Turbo codes. The performance of Turbo codes approached the Shannon limit for the channel capacity, which provoked a great deal of interest in the research community. Generalizing the use of iterative decoding has been proposed to be used in the different blocks of the receiver. All the receiver modules use soft input soft output (SISO) operations in order to maximize information exchange between them. A method that uses the concept of iterative decoding for iterative detection of MOK signals is now presented.

FIG. 1 shows the block diagram of the noncoherent-coherent system. The first method is, as indicated by its name, an iterative algorithm where, a form of coherent detection follows the first standard noncoherent detector. Following the noncoherent detector and MAP decoder, the soft outputs of the decoder are used to calculate the probabilities of the symbols such that it can be used to estimate the channel. The presence of the interleaver here has a double advantage. The standard use of the interleaver is the prevention of the error bursts that can happen in deep fade periods. The other advantage of the interleaver is making the outputs of the decoder and channel estimator independent. The interleaver makes the bits affecting the decisions on a certain bit due to the decoding algorithm differ from the bits used to estimate the fading channel at the time of that bit.

Denote the reliability information of the data and code bits at the output of the decoder with soft outputs (i.e., MAP$_s$SOVA (soft output Viterbi algorithm), . . . ) by L(m). To calculate the probabilities of the data and code symbols use, $$p(x(m)=1) = \frac{e^{L(m)}}{(1+e^{L(m)})}$$

The above probabilities could not be used directly to estimate the channel. The bit probabilities are used to calculate the probabilities of the chips, which were physically transmitted through the channel.

First calculate the probability of symbols using $$p_s(k) = \prod_{l=1}^{\log_2 M} ([1-U_l][1-p(l)] + U_l p(l)), k=1,2,\ldots,M \quad (5)$$

where $U_j=1$ if the $j^{th}$ bit=1 for this symbol, if the $j^{th}$ bit=0, $U_j=0$, p(l) is the probability that bit l of the symbol=1. This calculation is repeated for every symbol instant, i.e., M different probabilities are calculated for every symbol instant.

Following the calculation of the symbols probabilities, the probabilities of the chips are calculated. The probability of the $l^{th}$ chip is given by $$p_{ss}(l) = \sum_{k=1}^{M} h_k p_s(k) \quad (6)$$

where $p_{ss}(l)$ is the probability that chip l equals 1, $h_k=1$ if chip l=1 in symbol k and $h_k=0$ if chip l=−1 in symbol k.

Now that the probability of the chips has been calculated, it is necessary to estimate the channel using this information. A Wiener filter is used in the filtering of the chips to obtain the channel estimate. The filter is designed as explained below. Only one filter is necessary for all points. The channel estimate is given by $$\hat{c}(m) = \sum_{j=-D}^{D} h(j)[2p_{ss}(m+j)-1]r(m+j)$$

where 2D+1 is the order of the filter, assumed odd. Following the channel estimator, coherent detection is performed. A number of iterations of the steps of demodulating said M-ary orthogonally modulated signal, calculating a metric, decoding said signal, calculating probabilities of different symbols for each symbol instance, and estimating a fading channel responsive to calculating the probabilities could be repeated until no gain or recognition improvement is detected. In the alternative, a threshold value of recognition improvement could be preset and the iterations could be stopped once that threshold is attained. That is, the threshold value could be based, for example, on no change in a specific decimal place or a comparison between the recognition improvement in two iterations versus a calculation of the effort per iteration. From the simulation results, in most instances two iterations after the initial noncoherent detector was enough to capture almost all of the gain from this scheme.

An alternate method could be used to perform quasi-coherent detection. It can be noticed that all the different MOK symbols start with a "1" which makes these signals, by design, good for SAD demodulation techniques. The rate of change of the fading dictates the rate of insertion of the known symbols. In the case of MOK signals, the known symbols are present with rate J=M. If J<$J_{max}$ then there is no need to complicate the signal by inserting more known symbols, and the SAD methods could be used without adding more known symbols. The channel estimate at the first step is obtained using only the known first chip. Following the first decoding step, the unknown chips are also used to estimate the channel exactly as in the noncoherent-coherent scheme.

Figure 6:
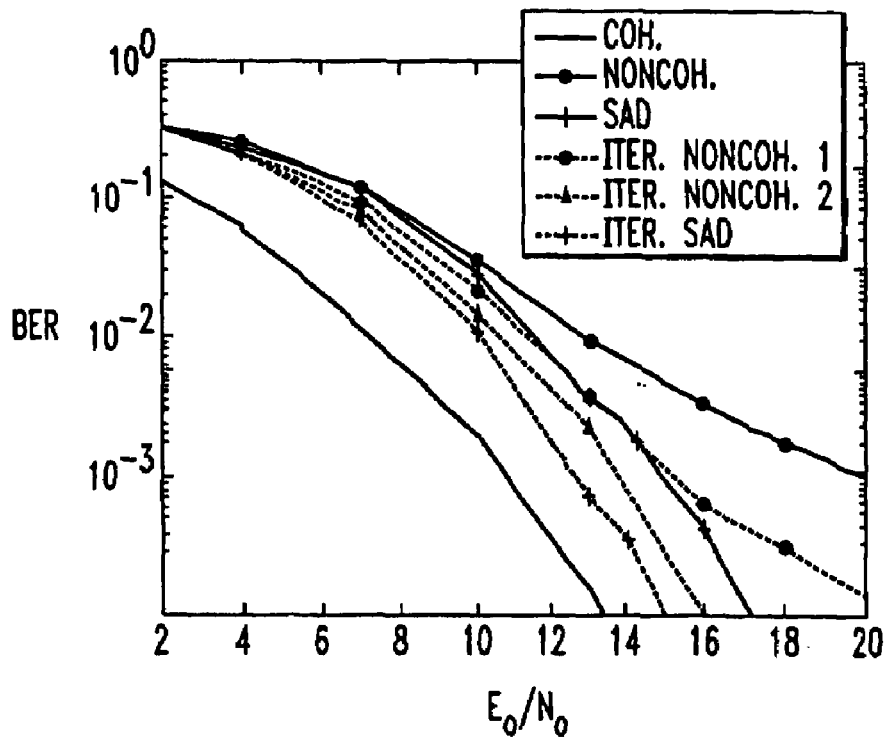
FIG. 6 shows the performance for MOK, for M=8 in Rayleigh fading channel with a fading rate of 10.
Figure 7:
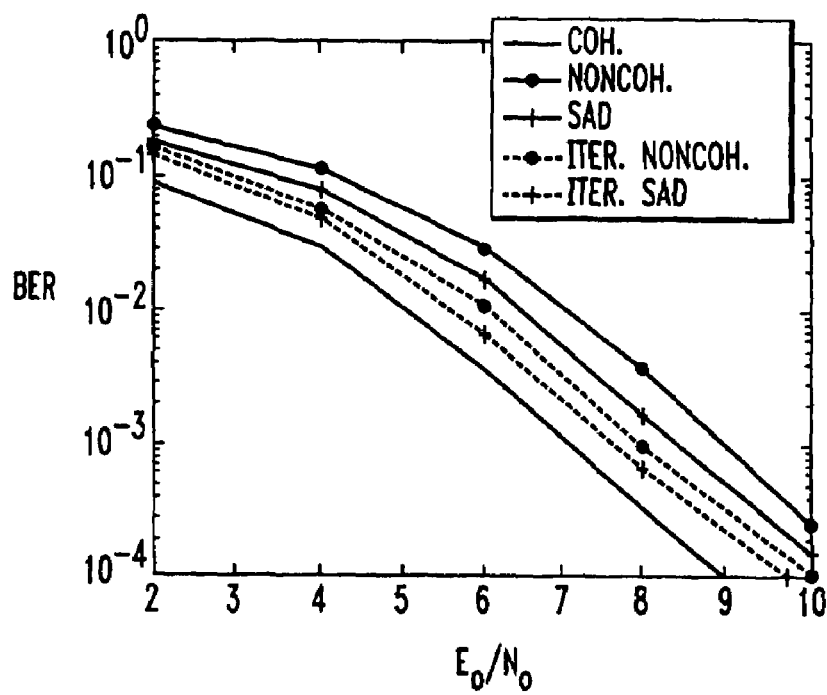
FIG. 7 shows the performance for MOK, for M=8 in Rician fading channel with a fading rate of 10.
Figure 8:
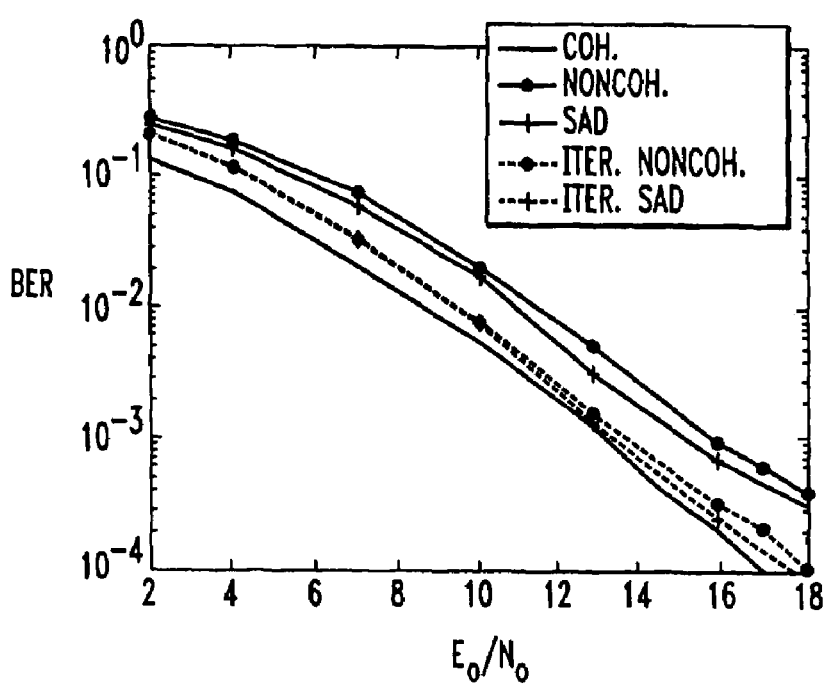
FIG. 8 shows the performance for MOK, for M=8 in Rayleigh fading channel with a fading rate of 40.
Figure 9:
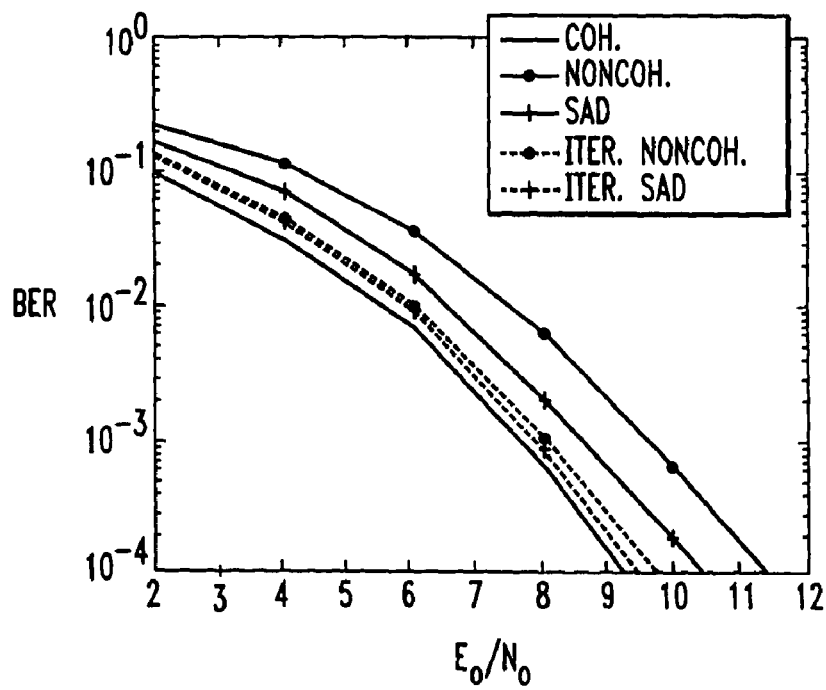
FIG. 9 shows the performance for MOK, for M=8 in Rician fading channel with a fading rate of 40.
Figure 10:
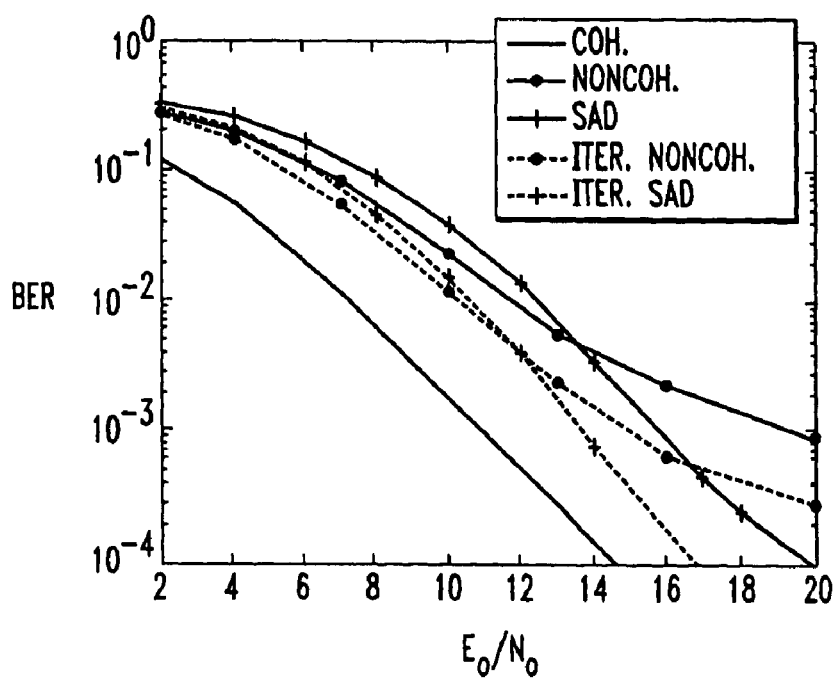
FIG. 10 shows the performance for MOK, for M=16 in Rayleigh fading channel with a fading rate of 20.
Figure 11:
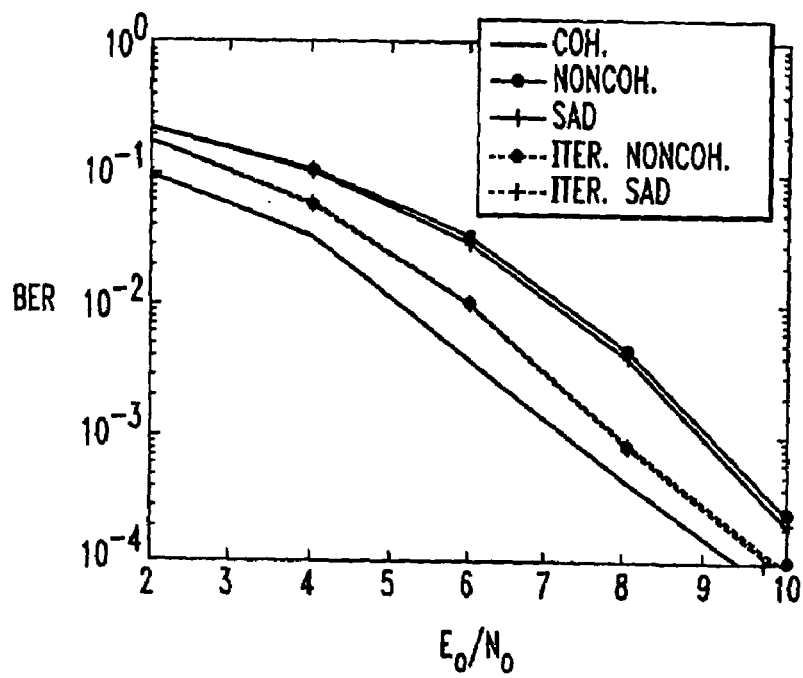
FIG. 11 shows the performance for MOK, for M=16 in Rician fading channel with a fading rate of 20.
Figure 12:
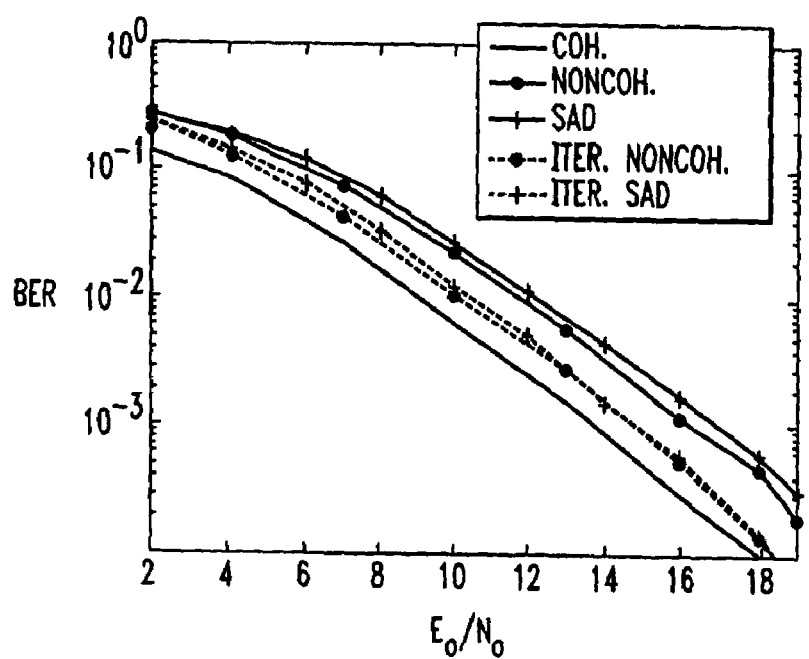
FIG. 12 shows the performance for MOK, for M=16 in Rayleigh fading channel with a fading rate of 80.
Figure 13:
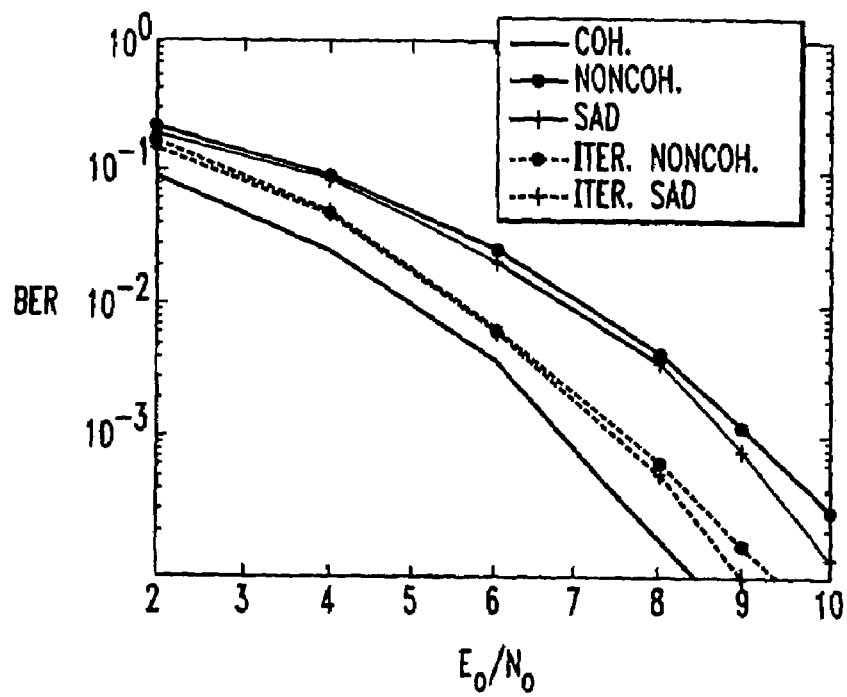
FIG. 13 shows the performance for MOK, for M=16 in Rician fading channel with a fading rate of 80.

The forward error control code used is rate ½, 4 state convolutional code with generator polynomials $5_8$ and $7_8$. Following the first decoding step, 2 more decoding steps that use the known symbols were conducted. The BER after the last step is shown in the figures and referred to as "Iter. Noncoh." And "Iter. SAD", except in FIG. 6 where 2 iterations were shown for the "Iter. Noncoh." algorithm.

FIG. 6 to FIG. 9 show the performance of MOK, for M=8 in Rayleigh and Rician fading channels for different fading rates, while FIG. 10 to FIG. 13 show the same for M=16. A number of trends could be observed. For M=8, the SAD scheme is better than the noncoherent scheme, and the performance of the iterative algorithms is very good. In almost all the cases, the iterative algorithm cut the difference between the coherent and either SAD or noncoherent by almost three quarters. In very fast Raleigh fading case ($J_{max}$=10 and K=0), we notice that there is an error floor for the noncoherent case while the SAD algorithm does not suffer from that (at least in the shown range). Also the iterative algorithm for noncoherent detection overcame the error floor after 2 iterations. For the most favorable channel ($J_{max}$=40 K=10), we find that the iterative algorithms' performance is extremely close (≈0.2 dB) to the coherent detection case.

For M=16, similar trends appear to hold, the only notable difference is that the performance of the noncoherent detector is sometimes better than the performance of the SAD scheme, most notably at low $E_b/N_0$ in very fast Raleigh fading ($J_{max}$=20 and K=0). A possible explanation of this, is that at low $E_b/N_0$ in fast fading, the noise effect maybe as dominant as fading, and the channel estimate produced by the SAD scheme at low $E_b/N_0$ is less reliable than the noncoherent case and less reliable than the estimate in the case of M=8 as the time interval between successive known chips is larger relative to the time between the chips (used by noncoherent detector). At high $E_b/N_0$, fading dictates the performance and the SAD scheme performance is better than the noncoherent scheme.

Recently, Harris Semiconductors and Lucent Technologies developed an approach called complementary code keying (CCK) to be used for high rate indoor wireless local area networks (WLAN). The IEEE 802.11 subcommittee adopted CCK as the basis for the physical layer of high speed transmission. CCK is a form of MOK modulation which uses an inphase-quadrature modulation architecture with complex signal structure. CCK is a modulation where one of M unique (orthogonal or nearly orthogonal depending on the number of codes needed) signal codewords is chosen for transmission.

Figure 14:
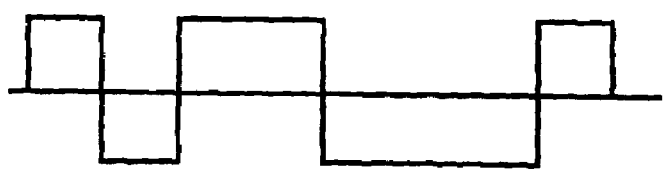
FIG. 14 shows the code set of complementary codes is much richer than the set of Walsh codes used in MOK.
Figure 14:
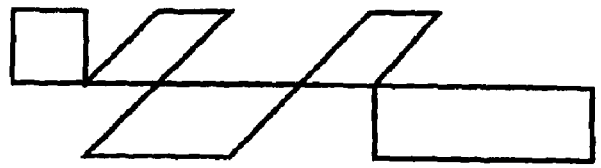

For M-ary biorthogonal keying (MBOK) there are 8 chips that have a maximum vector space of 256 codes, which there are sets of 8 that are orthogonal. Two independent vectors are selected for the orthogonal I and Q channels which modulate three bits on each. On additional bit can be used to DPSK each of the resulting I and Q codes. The code set of complementary codes is much richer than the set of Walsh codes used in MOK, as shown in FIG. 14. For CCK there are $4^8$=65536 possible codewords, and sets of 64 that are nearly orthogonal. The CCK codewords depicted in FIG. 14 lie in two planes, the page being a first plane and a second plane perpendicular to the first plane. This second plane is indicated by slanted lines. The codewords are the components of a signal constellation.

The IEEE 802.11 standard adopted CCK for the transmission of either 5.5 Mbps using a CCK code of length 8 to carry 4 bits or 11 Mbps using a CCK code of length 8 carrying 8 bits. For the half data rate version, a subset of 4 of the 64 vectors that have superior coding distance is used. The first 4 rows of table 1 shows a possible set. The code set used is given by $$C=[e^{\phi 1+\phi 2+\phi 3+\phi 4},\ e^{\phi 1+\phi 3+\phi 4},\ e^{\phi 1+\phi 2+\phi 4},\ -e^{\phi 1+\phi 4},\ e^{\phi 1+\phi 2+\phi 3},\ e^{\phi 1+\phi 3},\ -e^{\phi 1+\phi 1+\phi 2},\ e^{\phi 1}]$$

Where $\phi_j$:0,$\pi$/2,$\pi$,3$\pi$/2, j=1,2,3,4 for the 256 code set and $\phi_1$:0,$\pi$/2,$\pi$,3$\pi$/2

$\phi_2$:$\pi$/2,3$\pi$/2

$\phi_3$:0

$\phi_4$:0,$\pi$ for the 16 code set which is shown in table 1.

Since CCK symbols are QPSK in nature, they simultaneously occupy both the I and Q channels. The multipath performance of CCK is better than MOK and MBOK (M-ary biorthogonal keying) due to the lack of cross-rail interference. One of the advantages of CCK over MBOK is that it suffers less from multipath distortion in the form of cross coupling of the I and Q channel information. The information in CCK is encoded directly onto complex chips, which cannot be cross-couple corrupted by multipath distortion or fading. This superior encoding technique avoids the corruption resulting from half the information on the I channel and half on the Q channel as in MBOK, which is easily cross couple corrupted with the multipath phase rotation.

As mentioned before, one of the main advantages of MOK is the ability to demodulate the signal noncoherently. It is not possible to demodulate "simply" modulated MBOK or CCK signals noncoherently. By "simply" we mean assigning the code directly depending on the $\log_2 M$ bits, where M is the total number of codewords.

However, in the scheme adopted by the standard, signals can be demodulated noncoherently. For example, for the 5.5 Mbps CCK mode, the incoming data is grouped into 4 bit nibbles where two of the bits select the spreading function out of a set of 4 codes while the remaining two bits then differential QPSK (DQPSK) the carrier. Applying this to the code set shown in table 1, one of the first four codes is selected by 2 of the four data bits, the other 2 bits will rotate the selected code by 0, $\pi$/2, $\pi$, 3$\pi$/2.

TABLE 1

CCK codewords

| Codeword | 1 | 2 | 3 | 4 | 5 | 6 | 7 | 8 |
|---|---|---|---|---|---|---|---|---|
| 1 | 1 | j | 1 | −j | −1 | −j | 1 | −j |
| 2 | 1 | j | 1 | −j | 1 | j | −1 | j |
| 3 | 1 | −j | 1 | j | −1 | j | −1 | −j |
| 4 | 1 | −j | 1 | j | 1 | −j | 1 | j |
| 5 | j | −1 | j | 1 | −j | 1 | j | 1 |
| 6 | j | −1 | j | 1 | j | −1 | −j | −1 |
| 7 | j | 1 | j | −1 | j | 1 | −j | 1 |
| 8 | j | 1 | j | −1 | −j | −1 | j | −1 |
| 9 | −1 | −j | −1 | j | 1 | j | −1 | j |
| 10 | −1 | −j | −1 | j | −1 | −j | 1 | −j |
| 11 | −1 | j | −1 | −j | −1 | j | 1 | j |
| 12 | −1 | j | −1 | −j | 1 | −j | −1 | −j |
| 13 | −j | 1 | −j | −1 | j | −1 | −j | −1 |
| 14 | −j | 1 | −j | −1 | −j | 1 | j | 1 |
| 15 | −j | −1 | −j | 1 | −j | −1 | j | −1 |
| 16 | −j | −1 | −j | 1 | j | 1 | −j | 1 |

For example, if the first two bits chose the first code, the next two bits are encoded differently as follows. Denote the two bits that change the phase as $d_1$ and $d_2$. The phase at the $J^{th}$ time instant is given by $$\Phi_j = \Phi_{j-1} e^{\frac{((2d_2+d_1))}{2\pi}} \quad (7)$$

Therefore, if the first 2 bits chose the first code, depending on the second two bits and the previous phase, code number 1, 5, 9, or 13 is to be transmitted.

Figure 15:
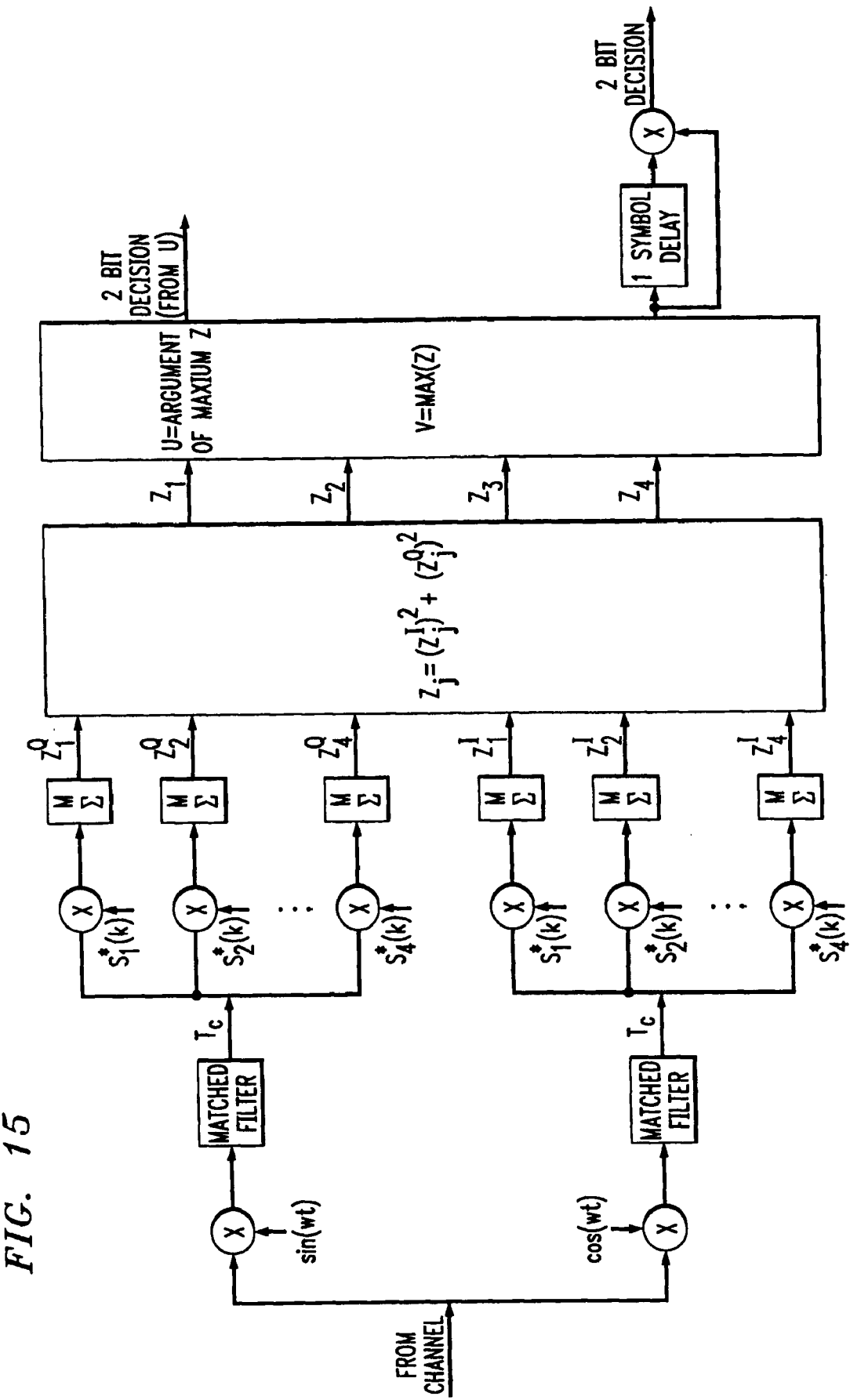
FIG. 15 depicts a noncoherent CCK detector.

The advantage of this scheme is the reduced complexity that can be used to demodulate it. First the detector/demodulator decides which one of the four basic codes is transmitted which can be done noncoherently as shown in FIG. 15. The apparatus depicted in FIG. 15 is similar to that depicted in FIG. 3 but only four basic codes are transmitted and received. The symbols $s_i*(k)$ are the complex conjugates of the possible codes. The MAP decoder or Viterbi decoder and metric calculator have been replaced with an algorithm that uses the argument of the maximum $z_j$ to decide on the first two bits and the maximum of $z_j$ to decide on the remaining two bits in a feedback loop with a one bit delay.

$z_j^I(k)$ and $z_j^Q(k)$ are calculated as follows $$z_j^I(k) = \sum_{l=1}^{M} Z_I(l) s_j^*(l)$$

$$z_j^Q(k) = \sum_{l=1}^{M} Z_Q(l) s_j^*(l)$$

$$z_j(k) = [z_j^I(k)]^2 + [z_j^Q(k)]^2$$

where j=1,2,3,4, $s_j$ is the $j^{th}$ codeword. * represents complex conjugate. Following this step, the argument of the maximum $z_j$ and the value of the maximum $z_j$ are used to decide on the first two bits and differentially demodulate the remaining two bits.

Define u as the argument of the maximum $z_j$ and v as the value of the maximum $z_j$. u is used to decide on the first two bits, while v is independently differentially demodulated to decide on the other 2 bits.

As will be shown in the results, for fading channels, the performance of the noncoherent detector of CCK is significantly worse than that of coherent detector where the data and code bits directly choose a codeword from the CCK codeword set, and a perfect channel estimate is available.

Figure 16:
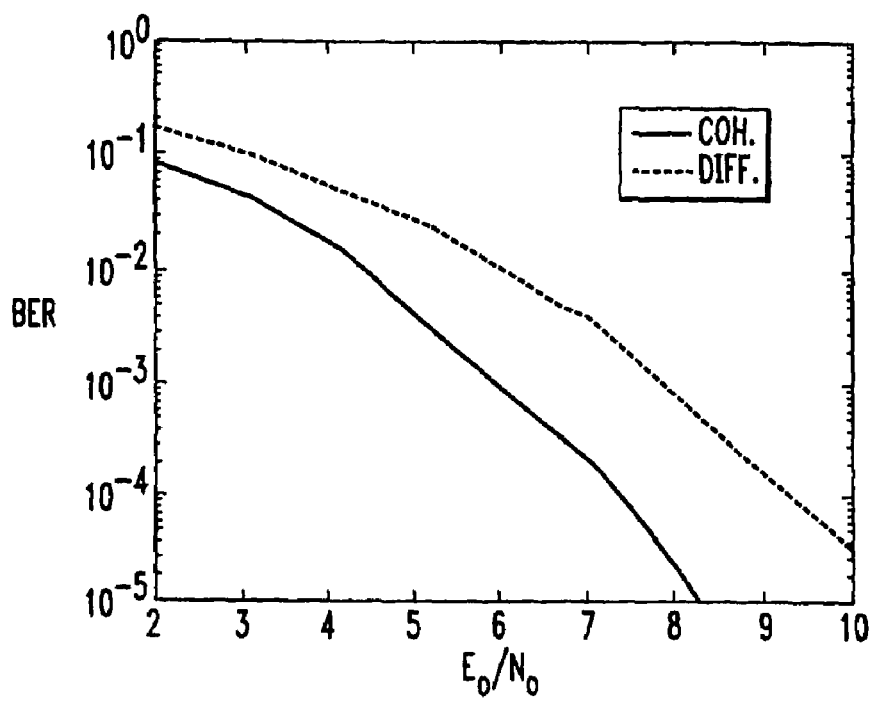
FIG. 16 compares the performance of coherent and non-coherent detectors for CCK in AWGN.

For AWGN channels, the performance of the noncoherent detector is worse than that of the coherent detector for up to 2 dBs unlike the simple MOK case where the difference may be as low as 0.5 dB. FIG. 16 shows the performance of convolutionally encoded CCK symbols with coherent and noncoherent detectors for the codewords shown in table 1.

Note that the modulation process differs for both cases. The input to the noncoherent detector is as explained in the previous section, while a direct mapping is used in the coherent detector case where 4 bits directly choose one of the 16 codewords.

The increased difference in performance between both detectors is due to differential encoding needed for the noncoherent detector. As CCK is a generalized form of MBOK, there is no way to apply noncoherent detection techniques for simply encoded signals. The complex method of encoding described earlier, is the key factor enabling noncoherent detection.

As will be shown below in the numerical results, the performance of noncoherent detectors of CCK in fading channels is much worse than that of coherent detectors. A modification to the current CCK method improves the performance significantly over the noncoherent CCK system proposed by Lucent technologies and Harris semiconductors. As mentioned previously in the MOK case, the knowledge of the first chip of all the symbols, makes SAD demodulation a viable alternative for MOK signals in fading channels. In the present method an extra chip is added at the beginning of each symbol, say "1", that can be used to estimate the fading channel. This chip will increase the symbol size from 8 to 9 chips, which is a minimal increase relative to the performance improvement gained.

The method used for channel estimation is similar to the SAD-coherent technique used for MOK. At the beginning, the added known chips are used to estimate the channel at the different chip positions within the symbol using optimized Wiener filters as described below. Coherent detection is performed using the channel estimate obtained by the known chips, and a first decoding step is performed.

Equation 5 shows the calculation of the probabilities of the different symbols knowing the LLR at the output of the decoder. Following, the expected value of the conjugate of every chip given the symbol probabilities is calculated as follows $$E_{pss}(l) = \sum_{k=1}^{M} h_k p_s(k)$$

$h_k=1$ if chip l=1 in symbol k $h_k=i$ if chip l=-i in symbol k $h_k=-1$ if chip l=-1 in symbol k $h_k=-i$ if chip l=i in symbol k and the channel estimate is calculated by taking into consideration the known and unknown chips $$\hat{c}(m) = \sum_{j=-D}^{D} h(j) E_{ss}(m+j) r(m+j)$$

where h(j) is an optimum Wiener filter designed assuming perfect knowledge of the chips, 2D+1 is the filter length. This channel estimate is used to coherently demodulate the incoming signal and a new decoding step is performed.

Figure 17:
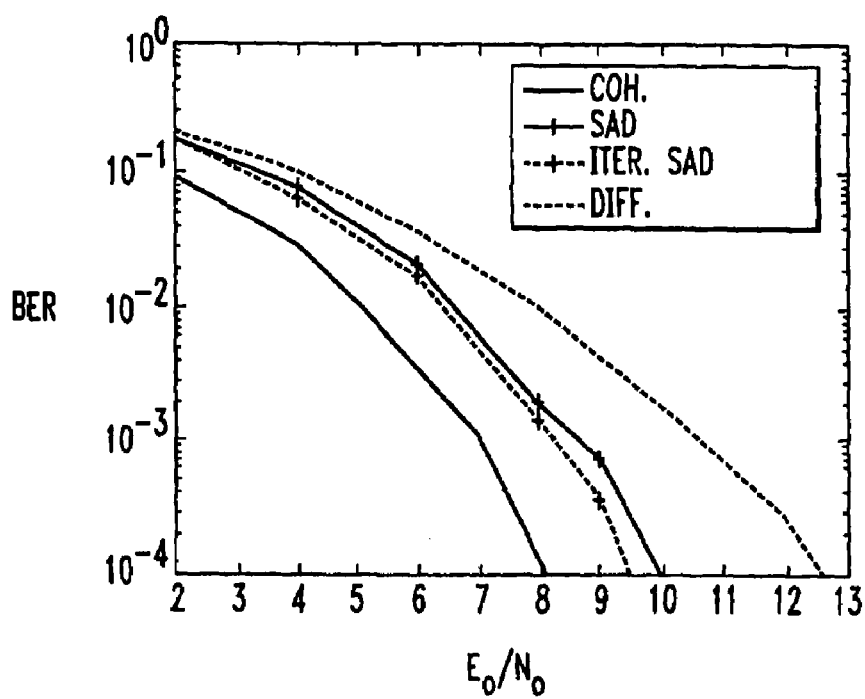
FIG. 17 shows the performance for CCK in Rician fading channel with a fading rate of 10.
Figure 18:
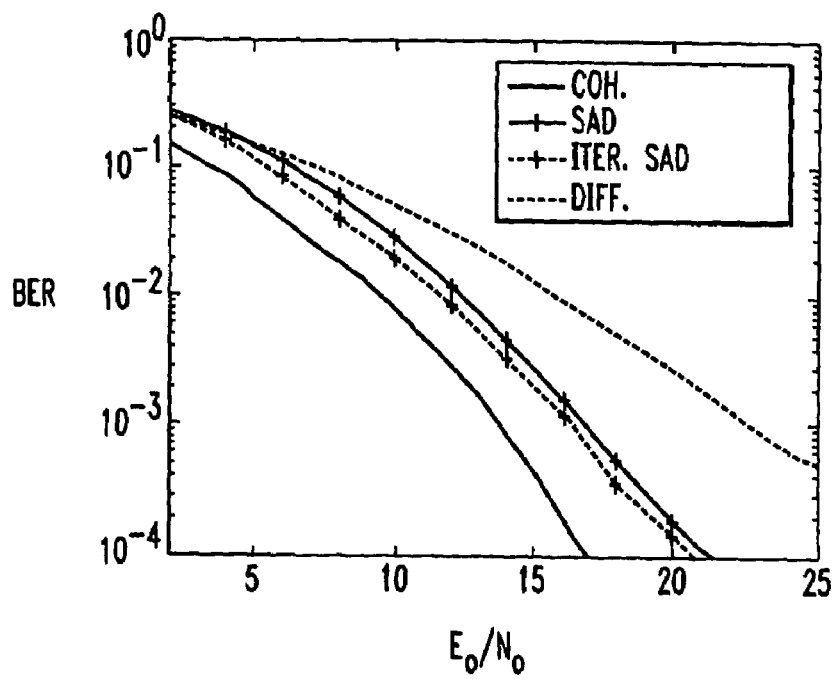
FIG. 18 shows the performance for CCK in Rayleigh fading channel with a fading rate of 40.
Figure 19:
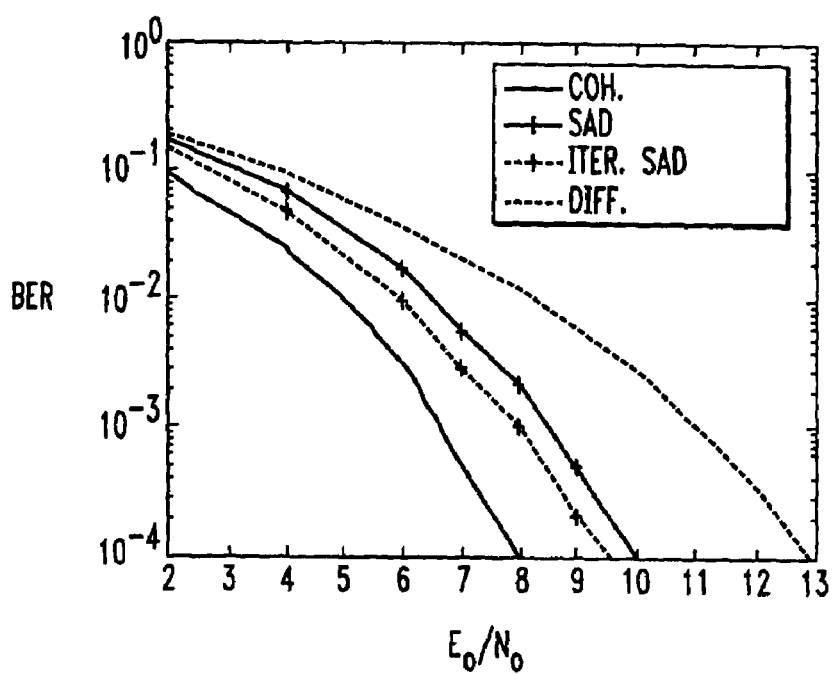
FIG. 19 shows the performance for CCK in Rician fading channel with a fading rate of 40.

FIG. 17 to FIG. 19 shows the performance of different CCK schemes in fading channels. The error control coding used is a rate ½, 4 state convolutional code with generator polynomials $5_8$ and $7_8$. Following the first decoding step, 2 more decoding steps that use the unknown symbols were conducted. The BER after the first step is denoted "SAD". "Diff." refers to the standard differential-noncoherent detector. It is very clear that for fading channels, the performance of the SAD scheme is significantly better than that of differentially detected CCK. The reason is that in the fading channels, differential detection's performance is affected greatly. Note that differential modulation is performed on the symbol level (not chips) which makes the time interval between successively demodulated bits relatively large for low data rates. The SAD method overcomes this drawback and does not use differential detection. Iterative SAD gains approximately 0.5 dB over SAD.

The Wiener filter is based on the least-squares principle, i.e., it finds the filter, which minimizes the error between the actual output and the desired output of the filter.

The estimate of the fading channel is given by $$v(k) = \underline{h}^\dagger(k)\underline{r} = \sum_{i=-D}^{D} h^*(i,k) r(iJ) \quad (8)$$

where $\dagger$ denotes conjugate transpose, and * denotes conjugate. $\underline{r}$ is the vector formed from the samples of the output of the matched filter at the known symbol instants, i is the index of the known (SAD) symbols where $-D \leq i \geq D$ and k is the position of the unknown data symbol in the frame where $1 \leq k \geq J-1$. Note that there are J−1 different filters used. The Wiener filter equation is given by $$\tilde{R}\underline{h}(k) = \underline{w}(k) \qquad (9)$$

where $\tilde{R}$ is the autocorrelation matrix of size 2D+1 defined by $$\tilde{R} = \frac{1}{2}E[\underline{r}\underline{r}']$$

and the J−1 length 2D+1 vectors $\underline{w}(k)$ are given by $$\underline{w}(k) = \frac{1}{2}E[u^*(k)\underline{r}]$$

The channel under consideration is Rician as described in equation (3), and hence $\tilde{R}$ and $\underline{w}(k)$ are given by $$R_{ij} = \frac{\gamma}{K+1}\frac{(J-1)}{J}\left[K + J_o\left(\pi\frac{(i-j)J}{J_{max}}\right)\right] + \left[\gamma\frac{(J-1)}{J}\frac{2(K_uL-1))}{3N} + 1\right]\delta_{i,j}$$

$$w_i(k) = \frac{\gamma}{K+1}\frac{(J-1)}{J}\left[K + J_o\left(\pi\frac{(iJ-k)}{J_{max}}\right)\right]$$

where i, j=−D, . . . , −1,0,1, . . . , D and $\delta_{i,j}$ is the Kronecker delta.

A novel method and system to improve the performance of MOK signals in fading channels has been described. The two methods presented improve greatly on the performance of simple noncoherent detectors of MOK, with minimal added complexity. From the numerical results it was clear that these methods approach the performance of coherent detectors within 0.2 dB in Rician fading. For fast Rayleigh fading, the error floor present using the noncoherent detector was removed using the iterative algorithm presented.

For CCK, the new method presented enhances greatly the performance and potential of using CCK for fast fading terrestrial mobile communications. The noncoherent system proposed in the prior art to be used for very high rate WLAN could not be used for fast fading channels as its performance degrades greatly. The scheme presented here adds minimal complexity and has performance close to the coherent detection case.

The method and apparatus described herein may be extended to signals received and detected over multipath channels. That is, the method and apparatus will work on multipath channels and are not limited to single mode channels with flat fading. This could be implemented in several ways and is fairly complex implementationally. Most, if not all, components in the receiver situated before the decoder will increase with the number of paths.

It should be clear from the foregoing that the objectives of the invention have been met. Although particular embodiments of the present invention have been described and illustrated, it should be noted that the invention is not limited thereto since modifications may be made by persons skilled in the art. The present application contemplates any and all modifications that fall within the spirit and scope of the underlying invention disclosed and claimed herein.

The invention claimed is:

1. Apparatus responsive to an applied signal representative of a received multi-chip symbol comprising:
   a non-coherent detector responsive to the applied signal, for developing a plurality of signals that are each related to a different possible symbol that the applied signal might contain;
   a coherent detector responsive to the applied signal and to a channel estimate, for developing a plurality of signals that are each related to a different possible symbol that the applied signal might contain; and
   a symbol selection module responsive to signals developed by the non-coherent detector and the coherent detector for developing a tentative decision regarding said received symbol, and a channel estimate that is coupled to the coherent detector; and
   a control module that is adapted to create in said apparatus iterative operations, where in a first iteration said symbol selection module operates on the signals developed by the non-coherent detector and in subsequent iterations develops an assessment of the tentative decision of the symbol selection module and, (a) when the assessment determines that another iteration ought to be undertaken, causes the symbol selection module to operate on the signals developed by the coherent detector, (b) when the assessment determines that another iteration ought not to be undertaken, outputs the most recently developed tentative decision as a final decision regarding the symbol contained in said applied signal.

2. The apparatus of claim 1 where the symbol selection module computes an approximate log likelihood ratio.

3. The apparatus of claim 1 where the first chip of the multi-chip symbol is know a priori and during the first iteration the symbol selection module makes an initial channel estimate based on said first chip.

4. The apparatus of claim 1 where the symbol selection module comprises a maximum posteriori probability (MAP) decoder.

5. The apparatus of claim 4 further comprising a deinterleaver preceding said MAP decoder.

6. The apparatus of claim 1 where the channel estimate is computed from calculated probabilities of the chips of the most recent tentative decision of the symbols selection module.

* * * * *